Patented Dec. 25, 1945

2,391,831

UNITED STATES PATENT OFFICE 2,391,831

CATIONIC ACTIVE COMPOUNDS

David W. Jayne, Jr., Old Greenwich, and Harold M. Day, Cos Cob, Conn., assignors to American Cyanamid Company, New York, N. Y., a corporation of Maine No Drawing. Application December 11, 1941, Serial No. 422,542

5 Claims. (Cl. 260—404.5)

This invention relates to the manufacture of cationic active reagents and more particularly relates to the reaction products of higher fatty acid esters of halogen substituted aliphatic alcohols with primary or secondary di- or polyamines.

It is an advantage of the present invention that a new class of compounds are provided which have a wide field of usefulness in the commercial arts and are especially well-suited as promoters for acidic minerals. Another advantage of the present invention is that a process of producing the above compounds is provided which is easily carried out and uniformly results in excellent yields. Many further advantages will become apparent to those skilled in the art from the detailed description following hereafter.

In general we have found that our compounds may be prepared by reacting a halogen substituted aliphatic alcohol of the class represented by the following general formula $$HO-(CHR)_x-Hal$$

where $x$ is a small whole number with a value of at least 2 and R is hydrogen or alkyl radical, with a higher fatty acid or other higher fatty acid acylating substance to produce an ester thereof.

The halogen substituted aliphatic alcohols suitable for producing these esters include ethylene chlorohydrin, ethylene bromohydrin, propylene chlorohydrin, propylene bromohydrin, butylene chlorohydrin, butylene bromohydrin, amylene chlorohydrin, and amylene bromohydrin, it being understood that the alkyl portion may be a branched or straight chain radical so long as it contains at least two carbon atoms since we have found that those containing only one carbon atom are not satisfactory for producing stable compounds in accordance with the present invention.

The ester so produced is then condensed with a primary or secondary di- or polyamine of the following general formula $$A-NH-B-NH-A$$

where B is —$(CH_2)_x$— or

—$((CH_2)_x-NH-(CH_2)_x)_y$—

$x$ and $y$ being whole numbers of from 2 to 10 and A is hydrogen, an alkyl or an alkoxy radical. As is readily seen from the above formula, it is essential that the aliphatic amine employed contain at least two amino groups capable of reacting with the halogen of the higher fatty acid ester of halogenated aliphatic alcohols. The amino groups may both be primary or they both may be secondary or one may be secondary and one primary. Similarly the number of amino groups may be much greater than two. It is only essential that there be one amino group capable of reacting with the halogen ester to split out HCl and that another amino group be present so that the HCl may add on thereto and form the salt. Representative polyamines fulfilling the above requirements are those such as ethylene diamine, diethylene triamine, triethylene tetramine, monomethyl ethylene diamine, monoethyl diethyl tetramine, pentamethyl diamine, hydroxyethyl ethylene diamine, 1,2-di-(2'-ethanolamino) ethane, 1,2-di-(2',3'-propandiol amino) ethane, 1,3-di-(2'-ethanolamino)-2-propanol, N-1',2' - diamino - propylamino-2-ethanol, 1,2-di-(ethanolamino) - 3 - aminopropane, 1,2,3 - tri-(ethanolamino) - propane, tri - (monomethyl-aminomethyl) - ethanol, 1,2 - di - (4' - cyclohexanolamino)-ethane.

The higher fatty acids that may be employed in producing our compounds include those containing at least ten carbon atoms, representative of which are capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, talloel acids, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as l-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, etc.

The invention will be described in greater detail in conjunction with the following specific examples. The examples are given by way of illustration only, and the invention is not to be limited by the details set forth therein.

*Example 1*

A mixture of 28 grams of the beta-chlorethyl ester of coconut oil fatty acids and 10.5 grams of hydroxyethyl ethylene diamine was heated to 200° C. then cooled to room temperature. The product was a very viscous amber-colored paste, which was readily soluble in water to give a solution which foamed readily.

*Example 2*

A mixture of 42 grams of the beta-chlorethyl ester of coconut oil fatty acids and 13.5 grams of a mixture of polyalkylene polyamines containing 50% diethylene triamine, 25% triethylene tetramine and 25% tetraethylene pentamine, was heated to 200° C. then cooled to room temperature. The product was a viscous, water-soluble paste.

In the foregoing examples the beta-chlorethyl ester of coconut oil fatty acids may be replaced by any one of the higher fatty acid esters of aliphatic halogen substituted alcohols mentioned heretofore in the specification and products having similar properties obtained. Similarly the particular polyamines employed in the examples may be replaced in all or in part by any one of the polyamines mentioned in the specification. In general, it is only essential for producing the compounds in accordance with our invention that an equal molecular proportion of a higher fatty acid ester of one of the halogen substituted aliphatic alcohols described in the early part of the specification be heated with one of the aliphatic polyamines described heretofore. The products thus obtained are probably the hydrohalide salts of higher fatty acid esters of alkylated aliphatic polyamines. They are generally homogeneous viscous products which are soluble in water to give cation active solutions which readily foam and wet wool.

The various arts in which the compounds of the invention may be used commercially are widely diversified. In general, however, these compounds may be employed for the following uses among others:

1. Wetting or surface tension reducing agents.
2. Detergents.
3. Emulsifiers or dispersing agents.
4. Demulsifiers.
5. Lubricants.
6. Dye assistants.
7. Ore dressing.
8. As aids in chemical reactions.

We claim:

1. A process of producing chemical compounds containing the group

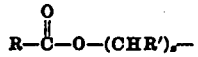

which comprises reacting substantially molecular equivalents of a halogenated ester having the formula

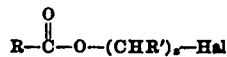

in which R is the acyl radical of an aliphatic fatty acid containing at least ten carbon atoms, R' is a radical selected from the group consisting of hydrogen and the lower alkyl radicals and $x$ is a small whole number with a value of at least two, with an aliphatic polyamine containing at least two amino groups selected from the group consisting of the primary and secondary amino groups at temperatures above about 200° C.

2. Chemical compounds selected from the group consisting of compounds having the formula:

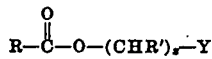

and the hydrohalide salts thereof, in which R is the acyl radical of an aliphatic acid containing at least ten carbon atoms, R' is a radical selected from the group consisting of hydrogen and the lower alkyl radicals, $x$ is a small whole number with a value of at least two, and Y is the residue of an aliphatic polyamine containing at least two amino groups selected from the group consisting of the primary and secondary amino groups, the bond between the polyamine residue and the remainder of the molecule being to an amino nitrogen.

3. Reaction products according to claim 2 in which Y is the residue of diethylene triamine.

4. Reaction products according to claim 2 in which Y is the residue of hydroxyethyl ethylene diamine.

5. Reaction products according to claim 2 in which Y is the residue of triethylene tetraamine.

DAVID W. JAYNE, Jr.
HAROLD M. DAY.